Feb. 10, 1959
F. COREY
2,872,699
POULTRY PROCESSING EQUIPMENT
Filed Dec. 2, 1955
2 Sheets-Sheet 1
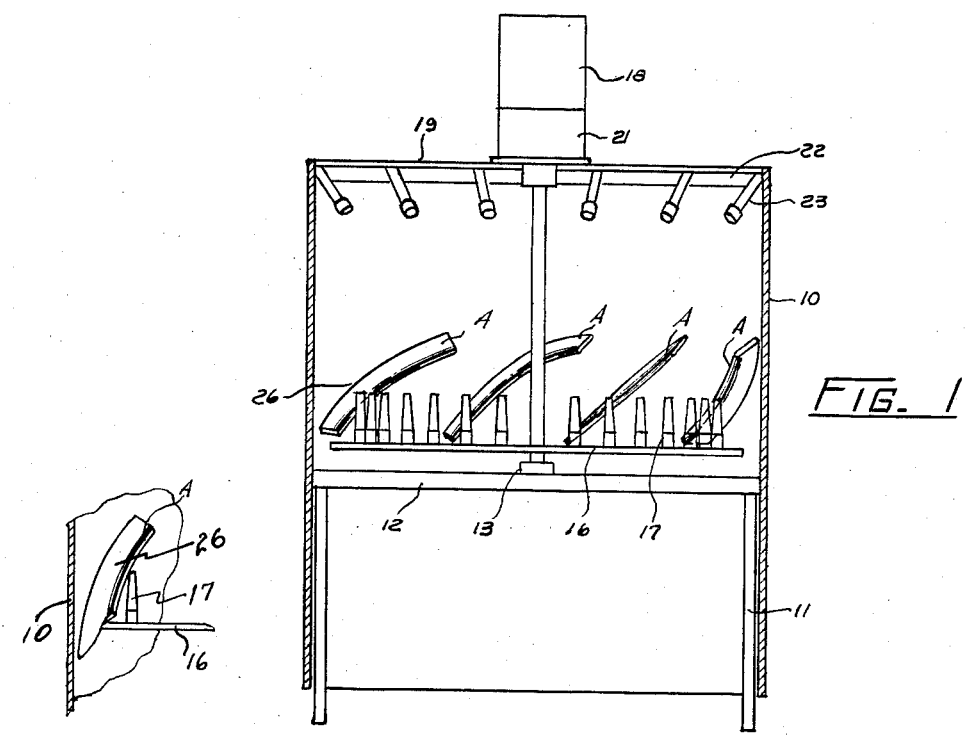
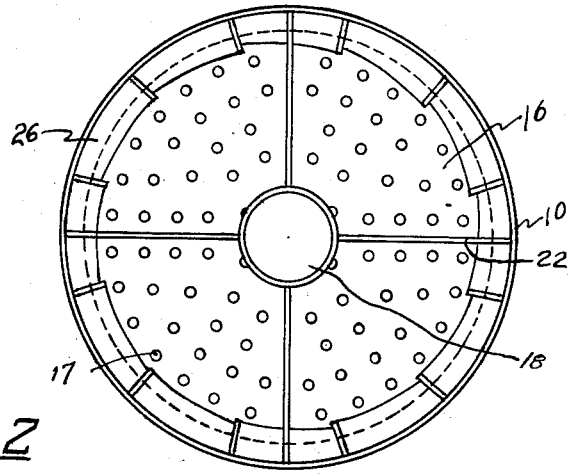
INVENTOR.
FLOURNOY COREY
BY
Flournoy Corey
ATTORNEY Feb. 10, 1959  F. COREY  2,872,699
POULTRY PROCESSING EQUIPMENT
Filed Dec. 2, 1955  2 Sheets-Sheet 2
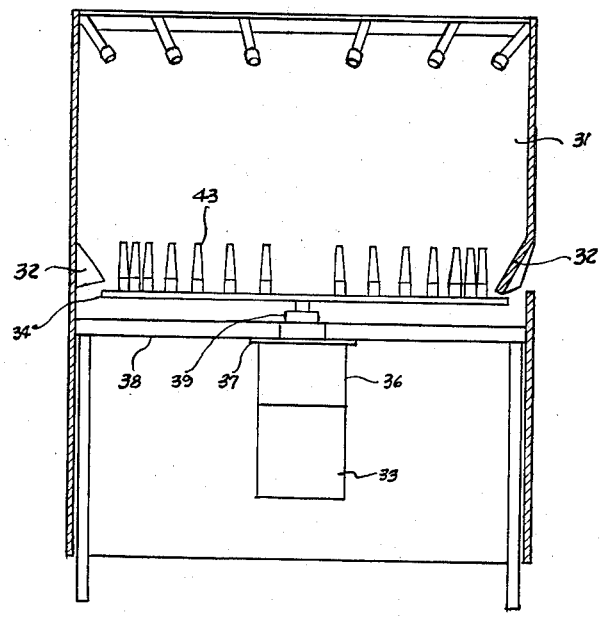
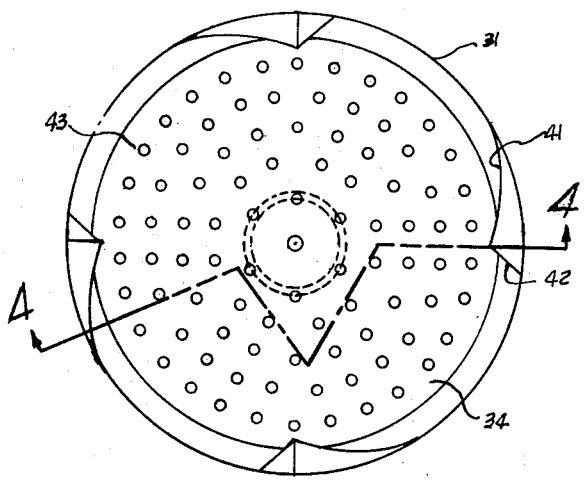
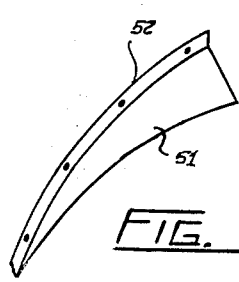
INVENTOR.
FLOURNOY COREY
BY
Flournoy Corey.
ATTORNEY United States Patent Office 2,872,699
Patented Feb. 10, 1959

2,872,699

POULTRY PROCESSING EQUIPMENT

Flournoy Corey, Cedar Rapids, Iowa

Application December 2, 1955, Serial No. 550,521

2 Claims. (Cl. 17—11.1)

This invention relates to poultry processing equipment and has particular relation to a device for use in the scalding and defeathering of the birds.

In the process of dressing poultry, consisting of killing, scalding, and defeathering the birds, I have found that both the scalding and defeathering processes are improved if the bird is agitated or caused to roll or turn so that new surfaces may be presented to the scalding water during the scalding operation and to the rubbing members during the picking operation.

I have accordingly devised a new and improved apparatus for the scalding and defeathering processes. The apparatus is particularly described in connection with the defeathering or picking operation, but it is apparent that if the scalding operation is carried on in the same housing or tub, the means for causing agitation of the birds may also be relied upon to promote the scalding operation of scalding fluid as introduced into the tub.

One of the main objects of my invention is to provide a simple and inexpensive apparatus for agitating the birds, which apparatus may be easily maintained in a clean and sanitary condition.

Other and further features and objects of the invention will be more apparent to those skilled in the art upon a consideration of the accompanying drawings and following specifications, wherein are disclosed several exemplary embodiments of the invention, with the understanding, however, that such changes may be made therein as fall within the scope of the appended claims without departing from the spirit of the invention.

In said drawings:

Figure 1 is a view in cross section of a machine constructed according to one embodiment of my invention.

Figure 2 is a plan view from above of the machine shown in Figure 1.

Figure 3 is a view in section of a fragmentary portion of a modified form of the device shown in Figure 1.

Figure 4 is a view, partly in section taken along line 4—4 of Figure 5 and partly in elevation, of a form of my invention.

Figure 5 is a plan view of the machine shown in Figure 4, and

Figure 6 is a view in perspective of a modified form of the flap of the device shown in Figure 4.

Referring now to the drawings, and more particularly to Figures 1 and 2; there is shown a form of the invention in which a substantially cylindrical housing 10 is mounted on supporting legs 11. In this form of the invention, a cross member 12 is provided with a suitable bearing 13 so that the drive shaft 14 of the disc drive may be mounted for rotation thereon. The disc 16 is secured to the shaft 14, the disc being provided with rubbing members as illustrated at 17.

The shaft 14 is driven by means of a motor 18 mounted on a suitable cross frame 19 above the housing, and the reduction from the motor speed to a slower disc speed is secured through a gear reducer illustrated at 21. Water may be introduced into the interior of the housing by pipe 22 and nozzles, such as illustrated at 23.

As may be readily understood, if a bird is placed on top of the rubbing members 17 and the motor caused to rotate, the bird is moved by centrifugal force outwardly against the inner wall of the housing 10, and there is also a tendency to carry the bird around in the direction of the rotation of the disc. The side walls of the housing retard this movement, and in order to secure and promote agitation and rolling of the bird, I have provided some inclined mould boards, such as illustrated at 26. These mould boards may be of rubber or even of metal, with the inner edges rounded off, as may be seen by reference to the drawing. These mould boards start at a point adjacent to the disc 16 and then slope upwardly in the direction of rotation of the disc to promote turning and agitation of the birds.

The mould boards or lift boards 26 preferably slope slightly downward from the wall of the housing toward the center line of the housing.

The mould boards may start at a position just above the disc, as illustrated in Figure 1, or may start at the position below the disc, as illustrated in Figure 3, so that interference with the poultry and the protruding parts, such as legs, wings, and so forth, is minimized.

A series of mould boards, such as illustrated in Figure 2, may be employed, the number thereof employed not being important.

In another form of the invention, the wall of the housing 31, illustrated in Figure 4, is bulged inwardly at several places, as illustrated at 32, for the purpose of turning and agitating the birds.

In this particular embodiment of my invention, the motor 33 is mounted below the disc 34 and the drive of the disc is geared through a reduction gear 36. The reduction gear housing has a flange 37 to permit mounting of the motor and reduction gear on a cross frame member 38 and a stout bearing is provided at 39 to carry the disc.

The inwardly bulged mould board 32 preferably has a more gradual slope from the wall of the housing on the leading edge, as illustrated at 41 in Figure 5 than at the trailing edge 42.

Rubbing members 43 are employed for defeathering the fowl.

In Figure 6 is illustrated another modification of the invention in which separate flap-like mould boards 51 are employed. These flaps have an upwardly extending flange 52 for securing the flaps to the inner wall of the housing and, as may be seen by inspection of the drawing, the width of the flange of the flap increases from leading to trailing edge.

It will be apparent that when the disc is rotated, the birds are carried about by rubbing members and thrown to the outer edge of the disc where they rub against the walls of the housing and are retarded thereby, to produce the rubbing action which is necessary to defeather the birds. The agitation and turning of the birds and the retarding action are increased by the mould boards I have shown and described.

Although I have described several embodiments of my invention, it is apparent that modifications may be made by those skilled in the art. Such modifications may be made without departing from the spirit and scope of my invention as set forth in the appended claims.

I claim as my invention:

1. A poultry picking machine comprising a vertically disposed casing having the upper end thereof open to receive feathered poultry, a horizontally disposed rotatable circular platform adjacent the lower end of said casing, platform supporting and rotating means operatively connected to said platform for supporting and rotating the same, a plurality of resilient feather rubbing members extending from a major portion of said circular platform adjacent the periphery thereof towards the interior of said casing, and a plurality of elongated, flat, resilient mould board members extending inwardly from the interior surface of said casing, said mould board members each being disposed in a sloping position extending upwardly in the direction of rotation of said circular platform and having a lowermost leading end and an uppermost trailing end, said lowermost leading end of each mould board being of reduced width and located at a point on the interior surface of said casing below the peripheral edge of said circular platform, said uppermost trailing end of each mould board being spaced above and overlying the lowermost leading end of the next adjacent mould board member.

2. A poultry picking machine as set forth in claim 1 wherein each of said elongated, flat resilient mould board members is inclined downwardly throughout the length thereof from the interior of said casing toward the vertically extending center line of said casing.

References Cited in the file of this patent

UNITED STATES PATENTS

| | | |
|---|---|---|
| 1,273,198 | Stallman | July 23, 1918 |
| 1,766,999 | Johnston | June 24, 1930 |
| 2,444,556 | Drews | July 6, 1948 |
| 2,571,034 | Harvey | Oct. 9, 1951 |

FOREIGN PATENTS

| | | |
|---|---|---|
| 39,040 | Sweden | June 30, 1915 |
| 958,264 | France | Sept. 12, 1949 |